United States Patent [19]

Eastman

[11] Patent Number: 5,019,698
[45] Date of Patent: May 28, 1991

[54] BAR CODE READING SYSTEMS HAVING ELECTRICAL POWER CONSERVATION AND LASER RADIATION POWER LIMITING MEANS

[75] Inventor: Jay Eastman, Pittsford, N.Y.

[73] Assignee: Photographic Sciences Corporation, Rochester, N.Y.

[21] Appl. No.: 390,020

[22] Filed: Aug. 7, 1989

[51] Int. Cl.$^5$ .............................................. G06K 7/10
[52] U.S. Cl. .................................... 235/462; 235/470
[58] Field of Search ................. 235/462, 463, 472, 470

[56] References Cited

U.S. PATENT DOCUMENTS

| | | |
|---|---|---|
| 3,684,868 | 8/1972 | Christie et al. |
| 4,682,015 | 7/1987 | Quan ................................... 235/472 |
| 4,694,182 | 9/1987 | Howard .............................. 235/462 |
| 4,758,717 | 2/1988 | Shepard et al. |

Primary Examiner—David Trafton
Assistant Examiner—Michelle S. Irvine
Attorney, Agent, or Firm—Martin Lukacher

[57] ABSTRACT

Bar code readers using laser diodes conserve electrical power and limit output laser radiation to levels required by governmental regulation (1 milliwatt average power) by utilizing a laser diode having a output optical power vs laser current characteristic which has a slope efficiency (the ratio of the change in power to the change in current, $\Delta P/\Delta I$, which is less than 1 in the region where stimulated (laser) emission occurs. The laser is operated with current pulses having a duty cycle less than 100%, and preferably in the range from 50% to 20% in the stimulated emission region of its characteristic, such that the average output laser power does not exceed the level required by government regulations (1 mw) while the laser output during the pulses is greater than 1 mw. Upon detection after reflection or scattering (return of light) from the bar code, the optical signal is photodetected to provide an electrical signal which is envelope detected and components of the signal at the repetition rate of the current pulses are removed, as by filtering. The filtered signal is digitized to provide a digital signal from which the bar code may be decoded.

8 Claims, 3 Drawing Sheets

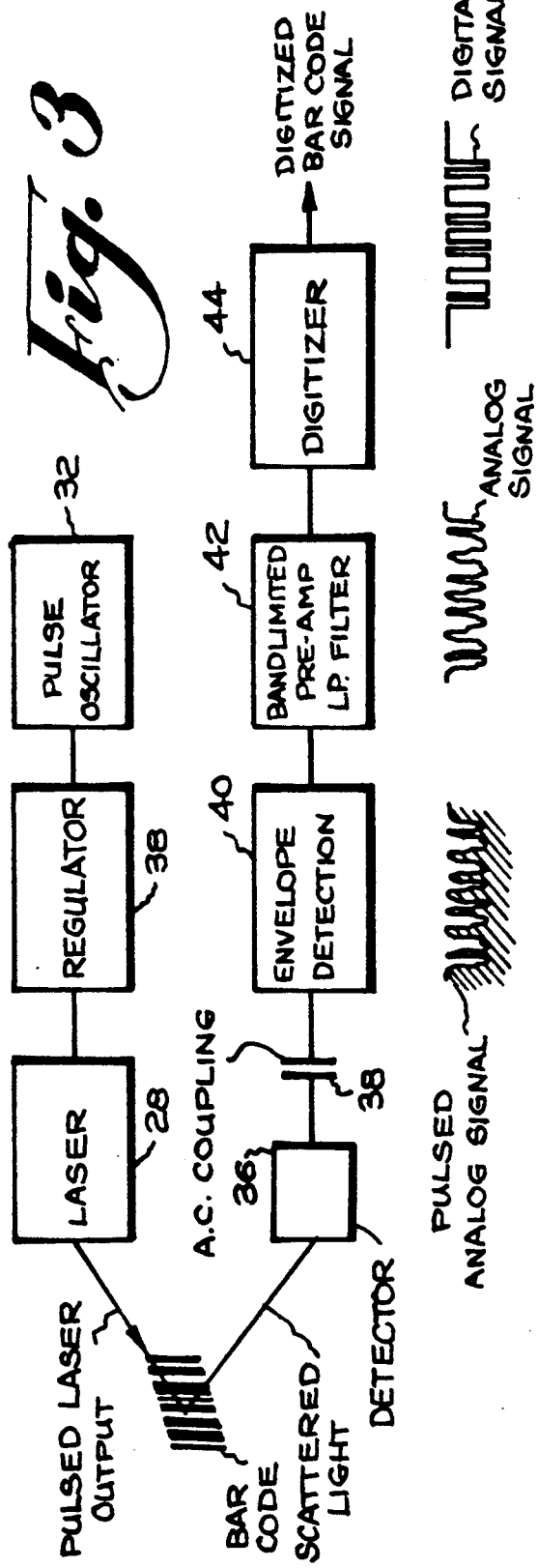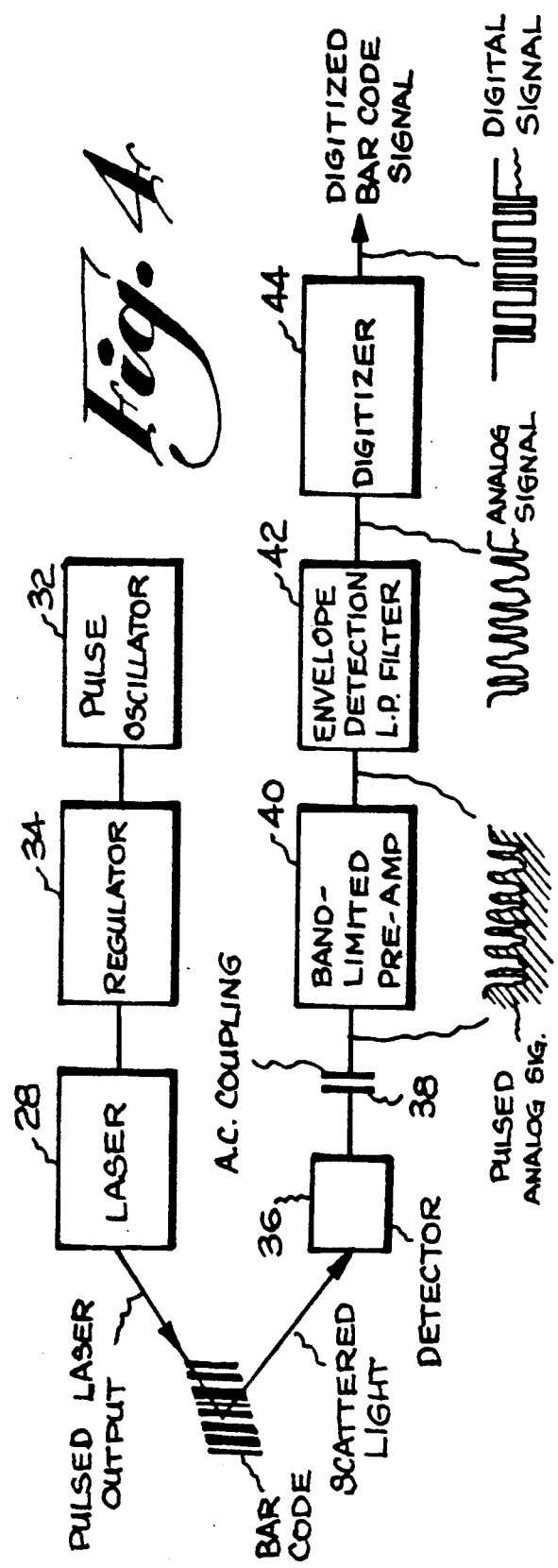

BAR CODE READING SYSTEMS HAVING ELECTRICAL POWER CONSERVATION AND LASER RADIATION POWER LIMITING MEANS

DESCRIPTION

The present invention relates to bar code reading systems and particularly to a bar code reader which is adapted for portable operation by conserving the electrical power utilized to operate the reader while at the same time limiting output optical power in the form of laser radiation to those prescribed by governmental regulation.

The invention is especially suitable for use in laser bar code readers and scanners (the term reader including scanners which scan a light beam across the bar code). However, the invention may also be utilized in fixed station bar code systems where radiation level limitation and efficiency of operation is desired.

Limitation of laser radiation is subject to regulatory restrictions in output power. Present regulations in the United States by the Center for Devices and Radiological Health (CDRH) require the output power of a practical (i.e., Class II) laser bar code scanner operating in the visible region of the spectrum to an average of 1 milliwatt (mw). Visible laser diode scanners which are presently available exhibit cw output power of 3 to 5 mw. 3 mw output power is obtained from model TLD 9200 manufactured by the Toshiba Corporation of Japan. CW power output of laser diodes may shortly exceed 10 mw. These governmental restrictions and other approaches for their accommodation in bar code systems are discussed in U.S. Pat. No. 4,639,606 entitled "Bar Code Scanner Laser Radiation Limit Control System", issued to John Boles and Jay Eastman on Jan. 27, 1987.

In a typical laser diode bar code scanner as shown in FIG. 1, a DC voltage reference 10 serves as an input to a laser regulator circuit 12. The regulator powers the laser diode 14 in a cw manner. The output from the laser is shaped by suitable optics (not shown) and scanned across the bar code by a scanning mechanism (not shown). Scattered light from the bar code is detected by a photodetector 16, ac coupled by a capacitor 18 and amplified by a band limited preamplifier 20. The preamplifier typically utilizes high and low pass filters that surround the frequencies present in the analogue bar code signal. The preamplifier also commonly contains an automatic gain control function (AGC). The output from the preamplifier is presented to a digitizer circuit 22 that converts the analogue signal corresponding to the bar code to a digital representation of the bar code. This digitized bar code signal may be decoded by bar code decoder equipment. Such a system operates in a cw mode. The optical power is limited to the level (1 mw) specified by regulatory restrictions.

It has been discovered in accordance with the invention that the operating current applied to the laser may be substantially reduced without degradation in the reading performance of the system and power consumption (i.e., current consumption) may likewise be reduced thereby specially benefitting portable battery powered devices, such as hand held bar code scanners. Such power conservation and radiation limiting advantages are obtained by operating the light source (laser) in a pulse mode rather than a cw mode but in a portion of the optical power vs operating current characteristic of the light source which obtains the power conservation and radiation limitation (without degradation in reading performance) advantages.

Pulse operation of bar code readers has been suggested (see Christe, et al. U.S. Pat. No. 3,684,868, Aug. 15, 1972 and Shepard, et al., U.S. Pat. No. 4,758,717, July 19, 1988) but not using current pulses in the range or light sources of the type which enable the above-mentioned advantages to be achieved.

Accordingly, it is the object of the present invention to provide an improved bar code reader system wherein the foregoing advantages are achieved.

It is a still further object of the present invention to provide an improved laser diode based bar code reader which is especially adapted for portable, battery powered operation.

Briefly described, the invention may be utilized in a bar code reader having means for providing a pulsed light beam adapted to be incident upon a bar code and to return therefrom and also having means which provides an electrical bar code signal corresponding to the bar code in response to the light returned therefrom. The bar code may be decoded from this electrical signal. The invention improves such bar code readers by utilizing in the light beam producing means a light source, such as a laser diode having an optical power output (P) vs. electrical current (I) characteristic having a slope $\Delta P/\Delta I$ which changes abruptly in the portion of its characteristic where the transition from spontaneous (incoherent) emission to stimulated (laser or coherent) emission occurs. The system also includes means for applying repetitive current pulses to the source to operate the source at a point near said transition and with a duty cycle such that the average optical power output does not exceed radiological health restrictions. The electrical signal providing means is operative to remove signal components at the repetition rate of the current pulses. The electrical signal may be presented to a digitizer to provide a digital signal from which the bar code is adapted to be decoded.

The foregoing and other objects, features and advantages of the invention and presently preferred embodiments thereof will become more apparent from a reading of the following description in connection with the accompanying drawings in which:

FIG. 3 is a block diagram of a laser based bar code reader in accordance with one embodiment of the invention;

FIG. 4 is a block diagram similar to FIG. 3 of a bar code reader in accordance with another embodiment of the invention.

Figure 2:
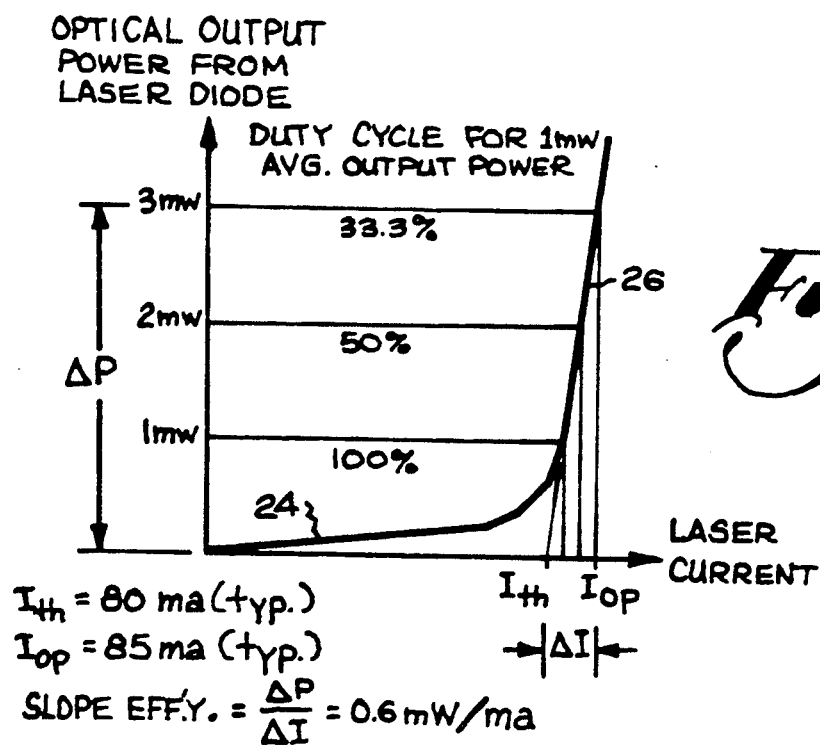
FIG. 2 is a laser diode operating characteristic curve.

Referring to FIG. 2, there is shown the nonlinear operating characteristic of a laser diode which may be used in implementing the invention. This curve shows that the laser diode has a region in which the optical power changes only slightly with laser current. This is the region at 24 of spontaneous emission. The characteristic shows another region 26 in which the optical output power increases dramatically (and linearly) with laser current. This is the region of stimulated or laser emission. The rate of change of optical output power with respect to laser current is the slope efficiency $\Delta P/\Delta I$.

For a typical visible laser diode, the initiation of lasing (stimulated emission) occurs at a threshold current $I_{th}$ which may be approximately 80 milliamps (ma). The slope efficiency in the lasing region 26 is less than 1 and typically is in the range of 0.6 for the Toshiba TLD 9200. By operating the laser diode in a pulse mode in the stimulated emission range 26, the average laser current may be lowered while maintaining an average optical output power (1 mw) which does not exceed the radiological safety limitations provided by government regulation.

Figure 5A:
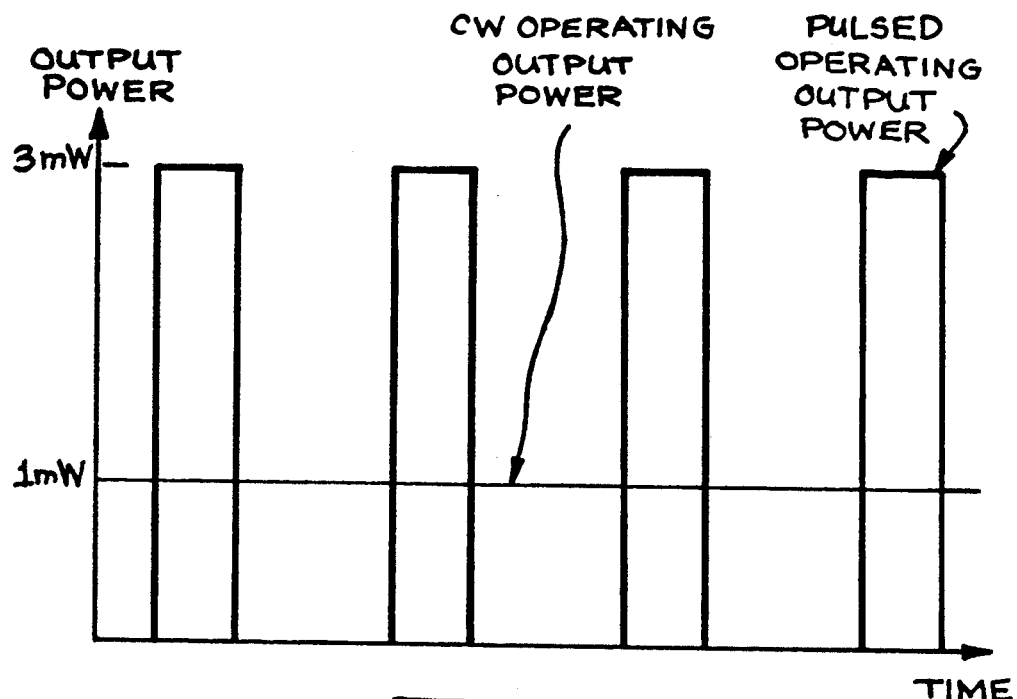
FIGS. 5A and B are waveform diagrams illustrating the optical output power and laser current waveforms resulting in the operation of the system shown in FIGS. 3 and 4.
Figure 5B:
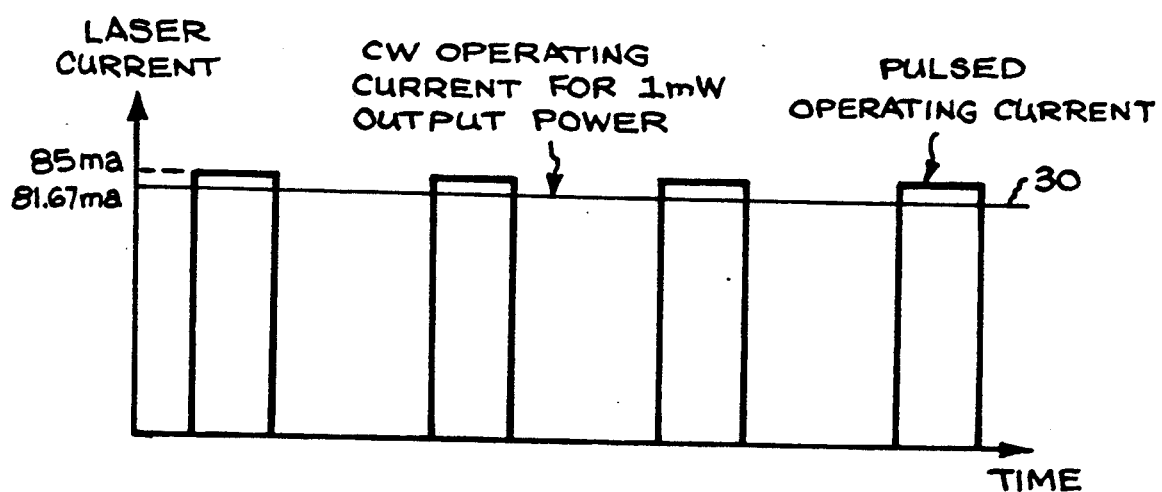

This is accomplished by pulsing the laser diode 28 (FIGS. 3 and 4) with current as illustrated in FIG. 5B. For example, the laser diode is run at a cw operating current of 81.67 ma, as shown by the line 30 in FIG. 5B. By operating the laser 28 in a pulse mode at a duty cycle of, for example 33.3%, with a pulsed drive current of 85 ma, an average output optical power of 1 mw is obtained, although each pulse from the laser is at an output power of 3 mw. In this case the average laser current is 28.33 ma. Thus, the average laser current is reduced by 53.34 ma or approximately 65.3% over the power required for cw operation at a 1 mw optical output power level. This results in substantial power and current reduction, while limiting the average output power so that it does not exceed radiological health and safety limits.

Figure 1:
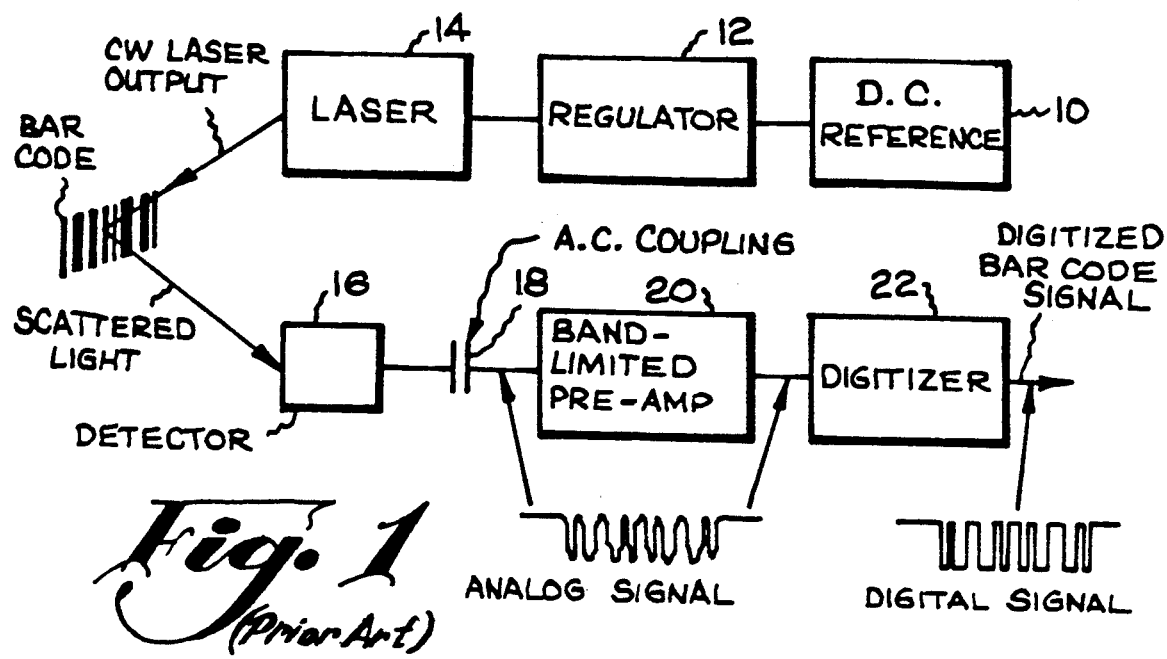
FIG. 1 is a block diagram of a laser based bar code reading system of the prior art which is discussed above.

Referring to FIG. 3, the laser 28 is operated by a pulse oscillator 32 which preferably operates at a frequency of 10 KHz or greater (e.g. 100 KHz) and with a duty cycle of from 50% ($\frac{1}{2}$) to 20% (1/5). The duty cycle selected is related inversely to the power output of the laser diode which is used, i.e. 1/N→Duty Cycle. The current pulses are regulated in a regulator 34 and applied to the laser diode 28. Scattered light is detected by a photodetector 36 upon return of the pulse laser output beam from the bar code. The detector 36 provides an analog pulse signal which is ac coupled by a capacitor 38 to an envelope detector 40. The envelope detector may be based on sample and hold, peak follower or other conventional envelope detection techniques. The envelope detector will also generally include a low-pass filter to remove the high frequency signal artifacts caused by the envelope detection process. The output of the envelope detector is an accurate representation of the analog bar code signal similar to that which is obtained in the prior art (compare FIG. 1). This analog signal is preamplified by a band limited preamplifier 42 which provides low-pass filtering action to remove the components at the frequency of the pulses (10 KHz or greater). These are the pulses which originate due to the current pulses from the pulse oscillator 32. The band limited preamplifier 42 is connected to a digitizer 44 which provides the digital signal corresponding to the bar code. This signal is applied to a decoder (not shown) to decode the bar code.

The system shown in FIG. 4 is similar to that shown in FIG. 3. The difference between the two systems is that the order of envelope detection and preamplification are interchanged. The high pass frequency of the preamplifier is greater than the pulse frequency in order to pass the pulse frequency of the laser. The low pass frequency in the envelope detector is high enough to pass the frequency contained in the bar code signal but not those due to the pulse laser operation.

From the foregoing description, it will be apparent that there has been provided an improved bar code reader system having electrical power conservation and optical (laser) power limiting features. Variations and modifications in the herein-described system within the scope of the invention will undoubtedly suggest themselves to those skilled in the art. Accordingly, the foregoing description should be taken as illustrative and not in a limiting sense.

I claim:

1. In a bar code reader having means for providing pulsed light beam adapted to be incident upon a bar code and which is returned therefrom, and means for providing an electrical bar code signal corresponding to such bar code in response to light returned from said bar code so as to enable decoding thereof, the improvement wherein said producing means comprises a light source having an optical power output (P) vs. electrical current (I) characteristic having a slope efficiency $\Delta P/\Delta I$ which is non-linear and characterized by an abrupt positive change between an initial region of low slope efficiency and a subsequent region of higher slope efficiency, and means for applying repetitive current pulses to said source to operate said source at a point on said characteristic in said region of higher slope efficiency and with a duty cycle such that the average optical power output is no greater than a certain level which does not exceed radiological health restrictions, and said electrical signal providing means comprises means for removing signal components of said electrical signal at the repetition rate of said current pulses.

2. The improvement according to claim 1 wherein said light source is a laser diode having said higher slope efficiency of said characteristic in a current range wherein said diode provides light by stimulated (laser) emission.

3. The improvement according to claim 2 further comprising means for applying the current pulses to said laser diode at a repetition rate of said pulses much higher than the spectrum of the signal due to said bar code.

4. The improvement according to claim 3 wherein said repetition rate is above 10 KHz.

5. The improvement according to claim 2 wherein said duty cycle is related inversely to the output power of said laser diode.

6. The improvement according to claim 2 wherein said duty cycle is in the range from 1/5 to $\frac{1}{2}$ and said current is of a level equal to the level which provides from five times said certain level of optical power when said duty cycle is 1/5 to twice said certain level of optical power when said duty cycle is $\frac{1}{2}$.

7. The improvement according to claim 1 wherein said means for providing said electrical bar code signal comprises a photodetector responsive to light returned from said bar code to provide an output signal means for envelope detection of said bar code signal, means for digitizing said bar code signal and said removing means comprises means for passing frequencies below the repetition rate of said current pulses between said envelope detection and digitizer means.

8. The improvement according to claim 1 wherein said means for providing said electrical bar code signal comprises a photodetector responsive to light returned from said bar code to provide an output signal means for envelope detection of said bar code signal, means for digitizing said bar code signal and said removing means comprises means for passing frequencies below the repetition rate of said current pulses between said photodector and said envelope detection means.

* * * * *

UNITED STATES PATENT AND TRADEMARK OFFICE
CERTIFICATE OF CORRECTION

PATENT NO. : 5,019,698

DATED : May 28, 1991

INVENTOR(S) : Jay M. Eastman

It is certified that error appears in the above-identified patent and that said Letters Patent is hereby corrected as shown below:

Column 4, line 9 change "providing" to --producing--.

Signed and Sealed this

Fifteenth Day of June, 1993

Attest:

MICHAEL K. KIRK

Attesting Officer

Acting Commissioner of Patents and Trademarks